United States Patent
Yang et al.

(10) Patent No.: US 11,493,602 B1
(45) Date of Patent: Nov. 8, 2022

(54) INTEGRATED MULTI-WAVELENGTH WDM TDM LIDAR TRANSMITTER

(71) Applicant: United States of America as represented by the Administrator of NASA, Washington, DC (US)

(72) Inventors: Guangning Yang, Greenbelt, MD (US); Jeffrey Chen, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 392 days.

(21) Appl. No.: 16/863,255

(22) Filed: Apr. 30, 2020

(51) Int. Cl.
*G01S 7/481* (2006.01)
*H01S 3/109* (2006.01)
*H01S 3/00* (2006.01)
*G01S 17/88* (2006.01)

(52) U.S. Cl.
CPC .......... *G01S 7/4811* (2013.01); *G01S 7/4814* (2013.01); *G01S 7/4818* (2013.01); *G01S 17/88* (2013.01); *H01S 3/109* (2013.01); *G02F 2201/16* (2013.01); *G02F 2203/70* (2013.01); *H01S 3/0092* (2013.01)

(58) Field of Classification Search
None
See application file for complete search history.

(56) References Cited

U.S. PATENT DOCUMENTS

| | | | |
|---|---|---|---|
| 2015/0029575 A1* | 1/2015 | Hara | H01S 3/11 359/279 |
| 2016/0087724 A1* | 3/2016 | Liu | H04B 10/25752 398/115 |
| 2019/0028203 A1* | 1/2019 | Kuse | H04J 14/02 |

OTHER PUBLICATIONS

Kuse et al. "Frequency-modulated comb LIDAR", APL Photonics vol. 4, 106105 (Year: 2019).*

* cited by examiner

*Primary Examiner* — Eric L Bolda
(74) *Attorney, Agent, or Firm* — Christopher O. Edwards; Bryan A. Geurts; Helen M. Galus

(57) ABSTRACT

A photonic, integrated circuit chip can have a frequency comb laser configured to generate a plurality of wavelengths, a plurality of modulators, one respective modulator for each wavelength of the plurality of wavelengths, the plurality of modulators being aligned in series with each of the plurality of modulators being tuned to a respective one of the wavelengths of the plurality of wavelengths, a connector configured to convey a drive signal for each modulator of the plurality of modulators, a semiconductor optical amplifier configured to receive light exiting from the plurality of modulators, and a chip having present thereon the frequency comb laser, the plurality of modulators, and the semiconductor optical amplifier. The plurality of modulators can be configured to produce a single beam of time-interleaved, multiple-wavelength output laser light. A mobile system, such as a satellite, can also have the photonic, integrated circuit chip as a component thereof.

18 Claims, 3 Drawing Sheets

INTEGRATED MULTI-WAVELENGTH WDM TDM LIDAR TRANSMITTER

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

FIELD OF THE INVENTION

The present invention relates to photonic, integrated circuit chip that can be included in a mobile system. The photonic, integrated circuit chip can include a frequency comb laser, a plurality of modulators, a connector, and a semiconductor optical amplifier. The mobile system can be a satellite, another space vehicle, a drone, a helicopter, and/or a plane.

BACKGROUND OF THE INVENTION

The recently developed WDM-TDM space lidar system uses a single laser with a multiple wavelength pulse stream. The lidar transmitter requires a time-sequenced, pulsed lidar, and each consecutive pulse in the sequence has a different wavelength. The WDM-TDM space lidar system currently uses a fast-tunable laser, tuning wavelength at MHz rate, followed by a high-speed external modulator, to generate a synchronized, nano-second pulse sequence. The time-sequenced, pulsed lidar can project laser pulses on the ground, thus forming tracks corresponding to each laser pulse, and measuring differences between the tracks can provide, e.g., mapping information about the earth. Furthermore, the tracks can be used to obtain data about objects moving across the tracks. For example, it is possible to measure, e.g., the speed of an aircraft travelling across an area having the tracks projected thereon.

FIG. 1 shows a schematic diagram of a laser pulse sequence of a lidar system that produces tracks on an object. An airborne or spaceborne lidar system projects light onto an object by generating a series of specific wavelengths and projecting each wavelength of the series of wavelengths onto an object via a gradient. The gradient spaces different wavelengths, and thus a series of tracks are projected onto an object, one track corresponding to each wavelength. As indicated in FIG. 1, which is a non-limiting example, a laser of a lidar system can produce a series of 11 discreet, pulsed wavelengths of light. Each wavelength is projected onto an angle dispersion device (e.g. a gradient) that spaces each wavelength, and the result is a series of 11 tracks projected onto the object, each track spaced apart from each other. The spacing between tracks can be from several meters to several hundred meters, e.g., from 2 to 500 meters.

As seen in this example, one wavelength corresponds to one projected track. To increase the resolution of the measurement of the objects, more tracks are preferred, meaning that the laser of the lidar system needs to be able to produce a large number of discreet, pulsed wavelengths for projection onto the angle dispersion device.

FIG. 2 provides a graphical representation of the discreet, pulsed wavelengths of light. In this example, the laser is a tunable laser, and laser light is pulsed at 2 nano-second intervals. The result is a series of 11 pulsed wavelengths that can be projected onto the angle dispersion device.

Two technologies on the WDM-TDM space lidar system make the pulse sequencing work, and these technologies can drive up the engineering implementation complexity and power consumption of the space lidar system. The first technology is a fast-tunable laser that has a high tuning speed (~few MHz) and tuning wavelength range (~30 nm). The second technology is a modulator for nano-second pulse formation in the laser beam, the modulator having a low duty cycle, high extinction ratio (>35dB), and wide spectral range (~30 nm). The preferred modulator is a lithium-niobate modulator having a high extinction ratio (>35dB), and it achieves narrow optical linewidth based by physics (interference of optical field).

The two technologies mentioned above result in several drawbacks in the lidar system using them. First, the fast-tunable laser can result in poor resolution in some regimes, such that accurate data obtained by using the tracks can be hard to obtain. Second, the two technologies can consume a large amount of power when on a satellite, which results in increased engineering costs and complicates the use of the satellite.

SUMMARY OF THE INVENTION

The present inventors have developed a lidar transmitter that is simpler in its design compared to the fast-tuning, pulsed laser system currently in use in space lidar systems. The lidar transmitter is a photonic, integrated circuit chip that has, present thereon, a frequency comb laser and a series of modulators. This design is a simpler design compared to the lidar system currently in use, i.e. the system having the fast-tunable, pulsed laser. The photonic, integrated circuit chip of the present invention can produce pulsed laser light without the use of a fast-tuning laser and modulator that produces nano-second pulses. The photonic, integrated circuit chip of the present invention can also incorporate many of its components onto a single chip, and it can avoid the use of a complicated WDM system. As a result, the photonic, integrated circuit chip of the present invention has an advantage of no wavelength tuning, as a laser frequency comb generates all of the wavelengths. Furthermore, an optical broad band modulator is not required, as each modulator is tuned to a specific wavelength. The photonic, integrated circuit chip of the present invention is thus simpler in its design, saving in development costs and power consumption while in use.

The present invention includes a photonic, integrated circuit chip that can have a frequency comb laser configured to generate a plurality of wavelengths, a plurality of modulators, one respective modulator for each wavelength of the plurality of wavelengths, the plurality of modulators being aligned in series with each of the plurality of modulators being tuned to a respective one of the wavelengths of the plurality of wavelengths, a connector configured to convey a drive signal for each modulator of the plurality of modulators, a semiconductor optical amplifier configured to receive light exiting from the plurality of modulators, and a chip having present thereon the frequency comb laser, the plurality of modulators, and the semiconductor optical amplifier. The plurality of modulators can be configured to produce a single beam of time-interleaved, multiple-wavelength output laser light.

The present invention also includes a mobile system that can also have the photonic, integrated circuit chip as a component thereof. The mobile system can be a satellite a drone, a helicopter, a plane, or a combination thereof.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying drawings, where like reference numerals designate like structural and other elements.

DETAILED DESCRIPTION OF THE INVENTION

Figure 1:
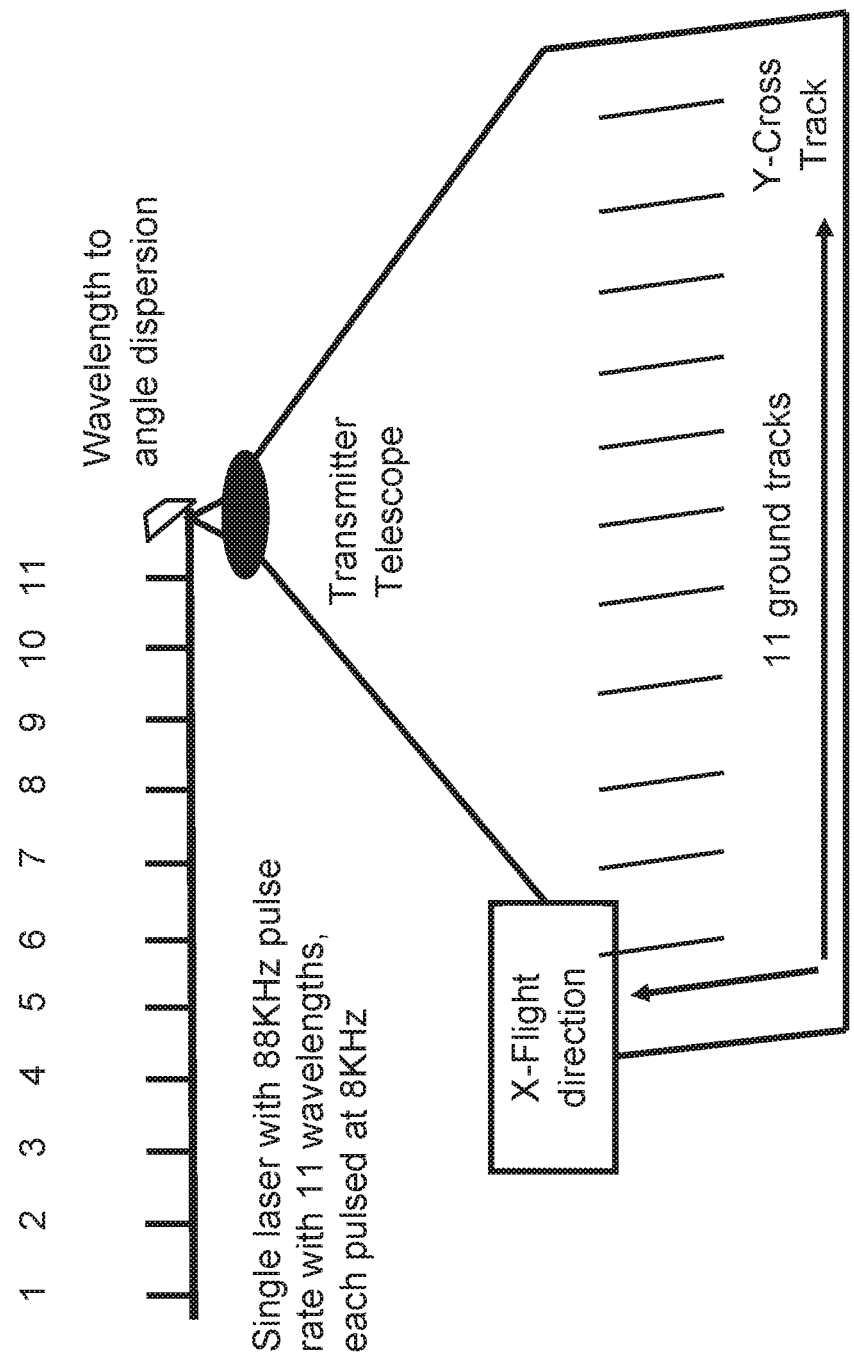
FIG. 1 is a scheme showing how laser pulses are used to form projected track marks on an object, such as the ground.
Figure 2:
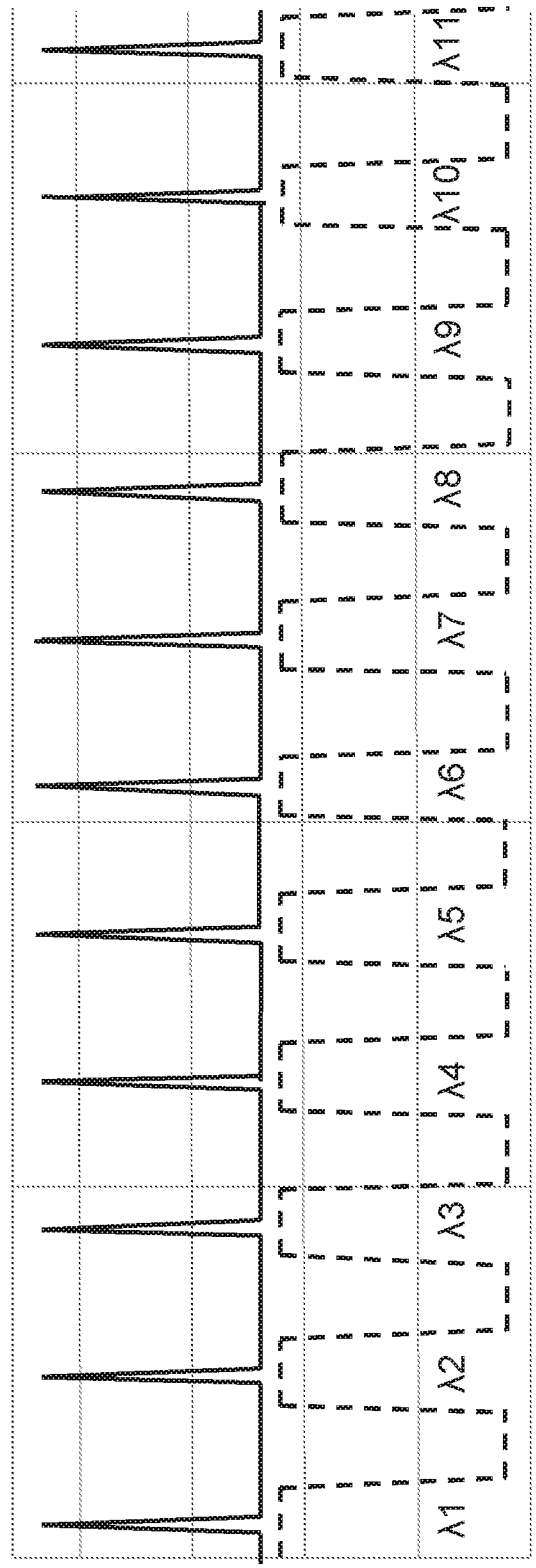
FIG. 2 is a scheme showing how timed laser pulses are formed.

According to various embodiments of the present invention, a photonic, integrated circuit chip is provided that comprises a frequency comb laser, a plurality of modulators, a connector configured to convey a drive signal for each modulator of the plurality of modulators, a semiconductor optical amplifier configured to receive light exiting from the plurality of modulators, and a chip having present thereon the frequency comb laser, the plurality of modulators, and the semiconductor optical amplifier. The plurality of modulators can be configured to produce a single-beam of time-interleaved, multiple-wavelength output laser light. The frequency comb laser can be configured to generate a plurality of wavelengths. The plurality of modulators can include one respective modulator for each wavelength of the plurality of wavelengths. The plurality of modulators can be aligned in series such that each of the plurality of modulators can be tuned to a respective, different one of the wavelengths of the plurality of wavelengths. The chip can comprise silicon.

The plurality of wavelengths generated by the frequency comb laser can be evenly spaced, unevenly spaced, randomly spaced, or a combination thereof. The wavelength spacing can be in the form of a pattern. The drive signal is designed to impart a time sequence and pulse shape to each wavelength modulated by the respective modulator. The photonic, integrated circuit chip can be configured to consume power in a range of from 75 mW to 150 mW. The plurality of wavelengths can comprise from 100 to 3,000 wavelengths, for example from 200 to 2,000 wavelengths, from 500 to 1,500 wavelengths, or from 700 to 1,000 wavelengths. The plurality of modulators can comprise from 100 to 3,000 modulators, for example, from 200 to 2,000 modulators from 500 to 1,500 modulators, from 700 to 1,200 modulators, or 800 to 1,000 modulators. The plurality of modulators can comprise from 100 to 3,000 modulators, provided that one respective modulator is provided for each wavelength of the plurality of wavelengths.

The semiconductor optical amplifier can comprise at least one of gallium, aluminum, arsenic, indium, and phosphorus. The plurality of wavelengths can be in the infrared spectrum, in the visible spectrum, or in a combination thereof. The photonic, integrated circuit chip can further comprise: a first waveguide that guides output from the frequency comb laser to the plurality of modulators; a second waveguide that guides output from each modulator of the plurality of modulators; and a third waveguide that guides output from the plurality of modulators to the semiconductor optical amplifier.

According to various embodiments, the present invention provides a mobile system comprising a photonic, integrated circuit chip as described herein. The mobile system can comprise a satellite, a drone, a helicopter, a plane, a spy plane, or a combination thereof. The mobile system can further comprise a processor configured to generate the drive signal for each modulator of the plurality of modulators, and an information conduit configured to connect to the connector and communicate the drive signal from the processor to each modulator.

According to various embodiments, the processor can be configured to generate the drive signal in the form of a pulse. One pulse can be generated for each wavelength, and the pulses can be generated in sequence, periodically, randomly, patterned, or in a combination thereof. The processor can be configured to generate the drive signal in the form of a pulse. One pulse can be generated in sequence for each wavelength of the plurality of wavelengths. The information conduit can comprise a ribbon connector.

The mobile system can further comprise a diffraction grating configured to receive the single beam of time-interleaved, multiple-wavelength output laser light and space-apart each wavelength from the single beam of time-interleaved, multiple-wavelength output laser light.

Figure 3:
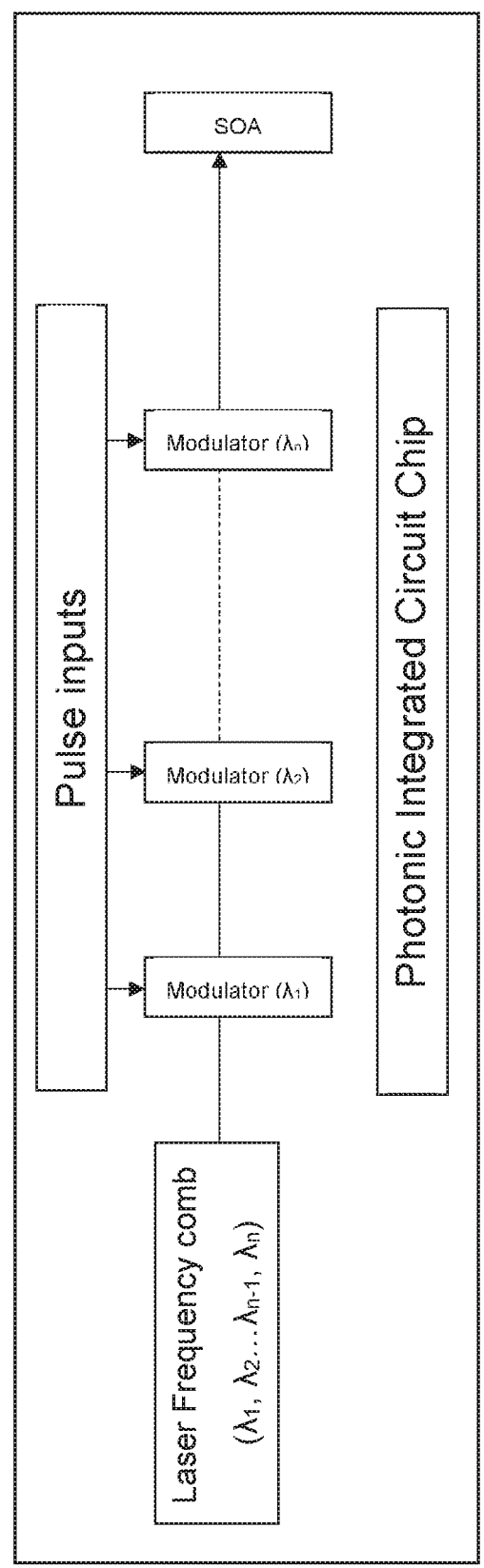
FIG. 3 shows a diagram of a photonic, integrated circuit chip according to the present invention.

FIG. 3 illustrates an example of the photonic, integrated circuit chip of the present invention. As an example, a chip can have present thereon or therein the frequency comb laser, a plurality of modulators, a connector that conducts pulse inputs to each modulator, and a semiconductor optical amplifier. A suitable power supply can be connected to the integrated circuit chip.

The frequency comb laser can comprise a laser that generates a spectrum of a series of discrete frequency lines. The frequency lines can be equally spaced frequency lines. The frequency comb can be generated by a number of mechanisms, including periodic modulation (in amplitude and/or phase) of a continuous-wave laser, four-wave mixing in nonlinear media, or stabilization of a pulse train generated by a mode-locked laser. The frequency comb laser of the present invention is not particularly limited. The frequency comb laser can be attached to a chip, and it can produce a plurality of single, discreet wavelengths.

The modulator is an optical device that can modulate light that is projected into it. The modulator can be tuned to one specific wavelength, meaning that one modulator can quench one specific wavelength from an incident light beam that comprises a plurality of wavelengths. According to various embodiments of the present invention, a plurality of modulators is present on the chip, one modulator for each wavelength of light produced by the frequency comb laser. If all modulators are active, each wavelength from the plurality of wavelengths is quenched and no light reaches the semiconductor optical amplifier.

According to various embodiments, the photonic, integrated circuit chip comprises a connector and the connector is configured to convey a drive signal for each modulator of the plurality of modulators. A processor and memory can be programmed to send pulses to each of the modulators on the chip. Each pulse is a drive signal that turns each modulator on and off. When one modulator is turned off, the light that is modulated by the modulator is allowed to pass through the modulator and be projected onto the semiconductor optical amplifier. Accordingly, the processor and memory can be programmed to operate each modulator in series, in a regular pattern, in an irregular pattern, or randomly, such that discreet wavelengths of light exit the plurality of modulators in a specific series or randomly. For example, the first wavelength can be the first wavelength to exit the plurality of modulators, then the second wavelength can be the second wavelength to exit the plurality of modulators, and so on.

Alternatively, the processor and memory can be programmed to operate differently, such as, randomly, or in an irregular pattern. For example, the processor and memory can be programmed to operate each modulator such that, e.g., the fifth wavelength exits the plurality of modulators first, the third wavelength exits the plurality of modulators second, and so on, provided that all wavelengths ultimately are projected onto the semiconductor optical amplifier. The processor and memory can be included on the chip, but they do not have to be. Just the processor can be included on the chip. Just the memory can be included on the chip.

In various embodiments, the processor and memory are present in the mobile system according to the present invention, but they are not present on the chip. As an option, the processor is off-chip and is configured to generate the drive signal for each modulator of the plurality of modulators. An information conduit can be present in the mobile system and can be configured to connect to the connector and communicate the drive signal from the processor to each modulator. The information conduit can comprise, for example, a ribbon connector.

The semiconductor optical amplifier amplifies the inputted optical signals within a designated optical-amplification ratio, and outputs the amplified optical signals. According to various embodiments of the present invention, the semiconductor optical amplifier is not particularly limited so long as it amplifies the inputted optical signals that exit the plurality of modulators. In one example, the semiconductor optical amplifier is a laminate structure of at least two semiconductor materials in an encasement. The semiconductor materials can be a combination of indium, gallium, arsenic, and phosphorus. In one example, a first semiconductor material in the laminate is n-doped indium phosphorus, a second semiconductor material in the laminate is indium gallium arsenic phosphorus, and a third semiconductor material in the laminate is p-doped indium phosphorus. Other combinations of materials and laminar structures can be used.

A laser pulse sequence of a lidar system can be used to produce tracks on an object. An airborne or spaceborne lidar system can project light onto an object by generating a series of specific wavelengths and projecting each wavelength of the series of wavelengths onto an object via a gradient. The gradient spaces different wavelengths, and thus a series of tracks are projected onto an object, one track corresponding to each wavelength. As exemplified in FIG. 1, the laser of the lidar system can produce a series of discreet, pulsed wavelengths of light, for example, a series of 10, 20, 30, 40, or 50 discreet, pulsed wavelengths of light. Each wavelength can be projected onto an angle dispersion device (e.g. a gradient) that spaces each wavelength, and the result is a series of tracks projected onto the object, each track being spaced apart from the others. The spacing between tracks can be from one foot to several hundred meters, for example, from 1 meter to 1000 meters, from 2 meters to 500 meters, from 5 meters to 300 meters, or from 10 meters to 100 meters.

One wavelength can correspond to one projected track. To increase the resolution of the measurement of the objects, more tracks are preferred, meaning that the laser of the lidar system can be configured to produce a large number of discreet, pulsed wavelengths for projection onto the angle dispersion device.

The discreet, pulsed wavelengths of light can be produced by a laser. In an example, the laser can be a tunable laser, and the laser light can be pulsed at intervals, for example, 1 nano-second intervals, 2 nano-second intervals, 5 nano-second intervals, 10 nano-second intervals, or 100 nano-second intervals. If the laser is configured to produce a series of 11 discreet, pulsed wavelengths of light, the result is a series of 11 pulsed wavelengths that are projected onto an angle dispersion device.

The present invention also includes a method of making a photonic, integrated circuit chip according to the present invention. The method can comprise, consist essentially of, consist of, or include, attaching a frequency comb laser, a plurality of modulators, a connector, and a semiconductor optical amplifier, to a chip. The chip can be a silicon chip. The frequency comb laser, plurality of modulators, connector, and semiconductor optical amplifier can be as described herein. Waveguides can be attached to, or etched into, the chip. The waveguides can connect the frequency comb laser to the plurality of modulators and can connect the plurality of modulators to the semiconductor optical amplifier such that light can pass between these components. The attachment can be by any suitable method, such as by gluing, soldering, fastening, through the use of fasteners, or by using a combination thereof.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A photonic, integrated circuit chip comprising:
   a frequency comb laser configured to generate a plurality of wavelengths;
   a plurality of modulators, one respective modulator for each wavelength of the plurality of wavelengths, the plurality of modulators being aligned in series with each of the plurality of modulators being tuned to a respective one of the wavelengths of the plurality of wavelengths;
   a connector configured to convey a drive signal for each modulator of the plurality of modulators;

a semiconductor optical amplifier configured to receive light exiting from the plurality of modulators; and a chip having present thereon the frequency comb laser, the plurality of modulators, and the semiconductor optical amplifier, wherein the plurality of modulators are configured to produce a single beam of time-interleaved, multiple-wavelength output laser light.

2. The photonic, integrated circuit chip of claim 1, wherein the chip comprises silicon.

3. The photonic, integrated circuit chip of claim 1, wherein the plurality of wavelengths generated by the frequency comb laser are evenly spaced wavelengths.

4. The photonic, integrated circuit chip of claim 1, wherein the drive signal is designed to impart a time sequence and pulse shape to each wavelength modulated by the respective modulator.

5. The photonic, integrated circuit chip of claim 1, wherein the photonic, integrated circuit chip consumes power in a range of from 75 mW to 150 mW.

6. The photonic, integrated circuit chip of claim 1, wherein the plurality of wavelengths comprises from 100 to 3,000 wavelengths.

7. The photonic, integrated circuit chip of claim 1, wherein the plurality of modulators comprises from 100 to 3,000 modulators.

8. The photonic, integrated circuit chip of claim 7, wherein the plurality of modulators comprises from 100 to 3,000 modulators, provided that one modulator is present for each wavelength of the plurality of wavelengths.

9. The photonic, integrated circuit chip of claim 1, wherein the semiconductor optical amplifier comprises at least one of gallium, aluminum, arsenic, indium, and phosphorus.

10. The photonic, integrated circuit chip of claim 1, wherein each wavelength of the plurality of wavelengths is in the infrared spectrum, in the visible spectrum, or in a combination thereof.

11. The photonic, integrated circuit chip of claim 1, further comprising a first waveguide that guides output from the frequency comb laser to the plurality of modulators, a second waveguide that guides output from each modulator of the plurality of modulators, and a third waveguide that guides output from the plurality of modulators to the semiconductor optical amplifier.

12. A mobile system, comprising the photonic, integrated circuit chip of claim 1.

13. The mobile system of claim 12, wherein the mobile system comprises a satellite, a drone, a helicopter, a plane, or a combination thereof.

14. The mobile system of claim 13, further comprising a processor configured to generate the drive signal for each modulator of the plurality of modulators, and an information conduit configured to connect to the connector and communicate the drive signal from the processor to each modulator.

15. The mobile system of claim 14, wherein the processor is configured to generate the drive signal in the form of a pulse, wherein one pulse is generated for each wavelength and generated in a sequence or randomly.

16. The mobile system of claim 14, wherein the processor is configured to generate the drive signal in the form of a pulse, wherein one pulse is generated in sequence for each wavelength of the plurality of wavelengths.

17. The mobile system of claim 14, wherein the information conduit comprises a ribbon connector.

18. The mobile system of claim 12, further comprising a diffraction grating configured to receive the single beam of time-interleaved, multiple-wavelength output laser light and space-apart each wavelength from the single beam of time-interleaved, multiple-wavelength output laser light.

* * * * *